Figure 1:
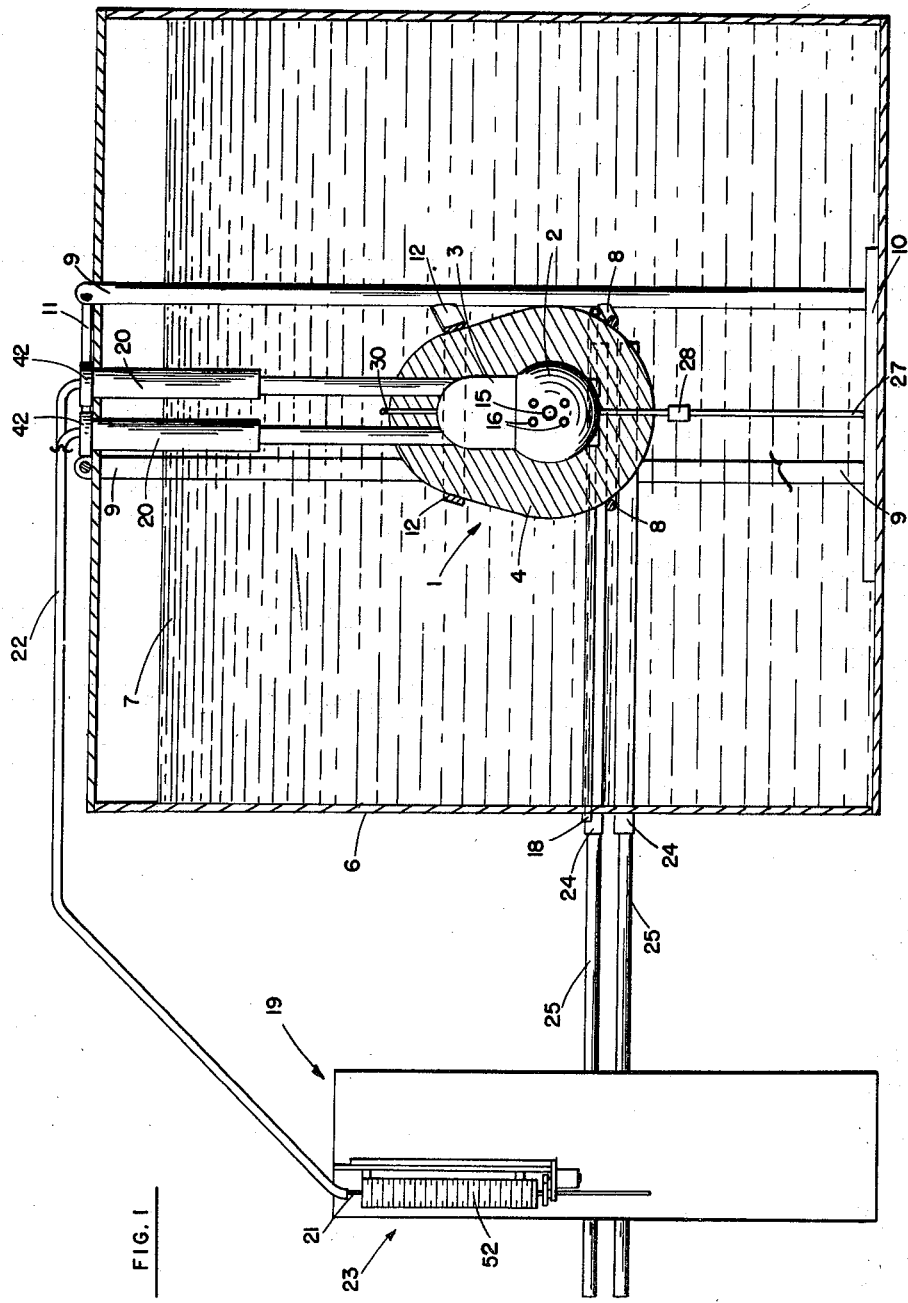

May 17, 1960 J. W. FLORA 2,937,127
LABORATORY REACTOR
Filed Sept. 4, 1956 5 Sheets-Sheet 1

INVENTOR.
JOHN W. FLORA
BY
*William R. Laine*
ATTORNEY

INVENTOR.
JOHN W. FLORA
BY
ATTORNEY

INVENTOR
JOHN W. FLORA

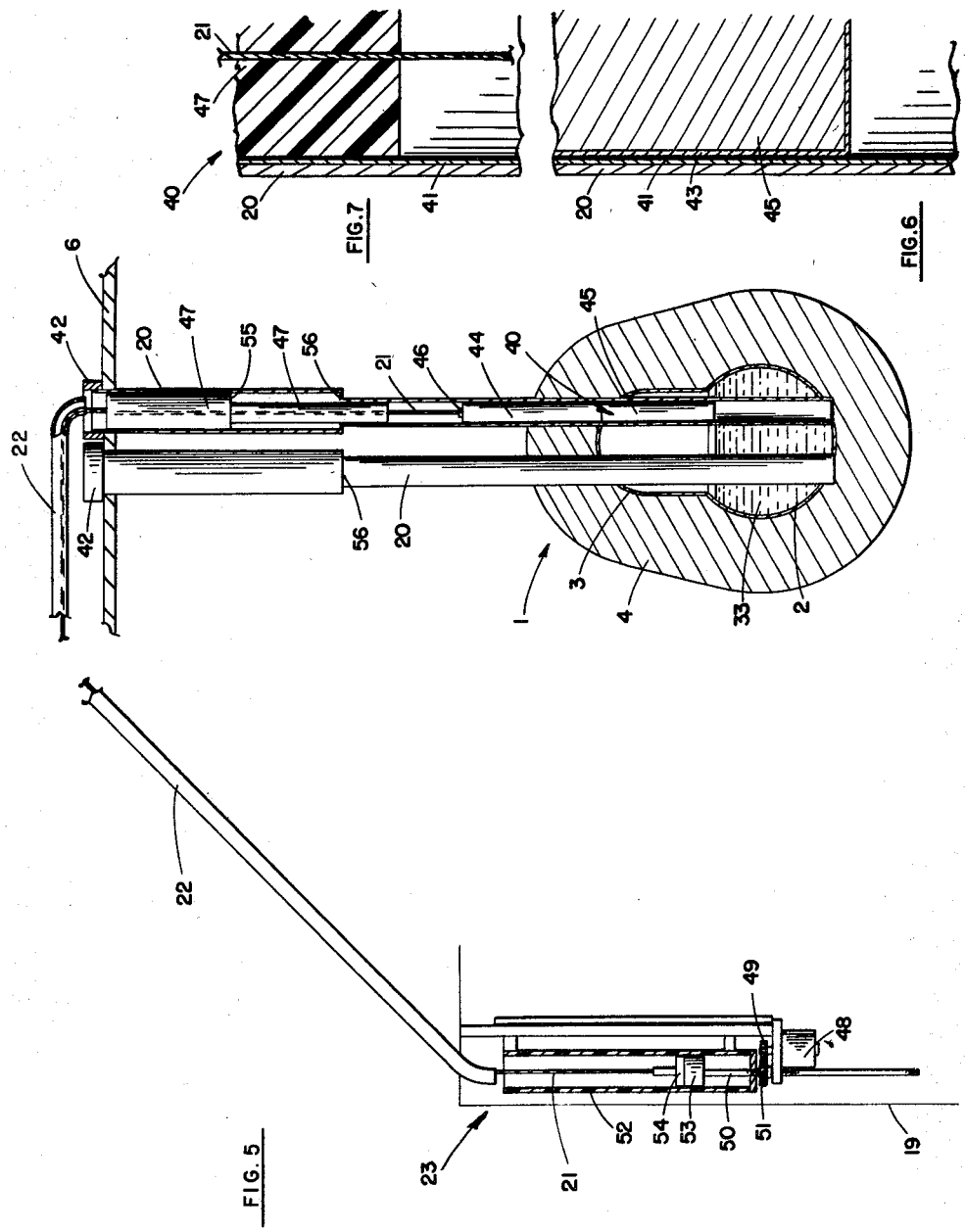

INVENTOR.
JOHN W. FLORA
BY
William R. Lane
ATTORNEY

United States Patent Office 2,937,127
Patented May 17, 1960

2,937,127
LABORATORY REACTOR

John William Flora, Canoga Park, Calif., assignor to North American Aviation, Inc.

Application September 4, 1956, Serial No. 607,929

12 Claims. (Cl. 204—193.2)

My invention relates to a low-cost research reactor, and more particularly to a low-cost water-boiler type of nuclear research reactor particularly suited for training and as a laboratory neutron source.

For information concerning the theory, construction and operation of nuclear reactors, reference is made to U.S. Patents 2,708,656 and 2,714,577 to Fermi et al.; Glasstone, "Principles of Nuclear Reactor Engineering" (D. Van Nostrand Co.); Schultz, "The Control of Nuclear Reactors and Power Plants," McGraw-Hill; "The Reactor Handbook" (3 volumes), published by the U.S. Atomic Energy Commission; and to "The Proceedings of the International Conference on the Peaceful Uses of Atomic Energy," held in Geneva, Switzerland, August 1955, and available for sale at the United Nations' Book Store, New York, New York. For specific information relating to the aqueous homogeneous reactors known as "water boiler" types, reference is made to "Research Reactors," Chapter I, published by the U.S. Atomic Energy Commission.

There are a number of institutions, including small universities and research laboratories which might profitably use a nuclear research reactor. Even a relatively low flux reactor could be used for a number of irradiation experiments, physical measurements and as an instrument for training personnel in reactor operation. However, the cost of even the smallest of the current research reactors is prohibitive to widespread use. The typical water-boiler reactor with an external gas recombiner, complicated instrumentation and control, solid reflector, and massive fixed shielding runs to several hundred thousand dollars. Then, a gas-tight building with special plumbing and other equipment normally must be provided; this commonly runs to one half million dollars. Thus, a complete installation of even the simplest research reactor may cost in the neighborhood of a million dollars.

An object of my present invention, therefore, is to provide a relatively simple, low-cost nuclear research reactor.

Another object is to provide a low-cost water-boiler type reactor possessing experimental versatility and operational simplicity.

Another object is to provide such a reactor possessing simplified internal gas recombiner, reflector, control and shielding means.

Still another object is to provide such a reactor wherein special building facilities need not be provided.

Yet another object is to provide such a reactor which is readily portable and is entirely self-contained.

Figure 2:
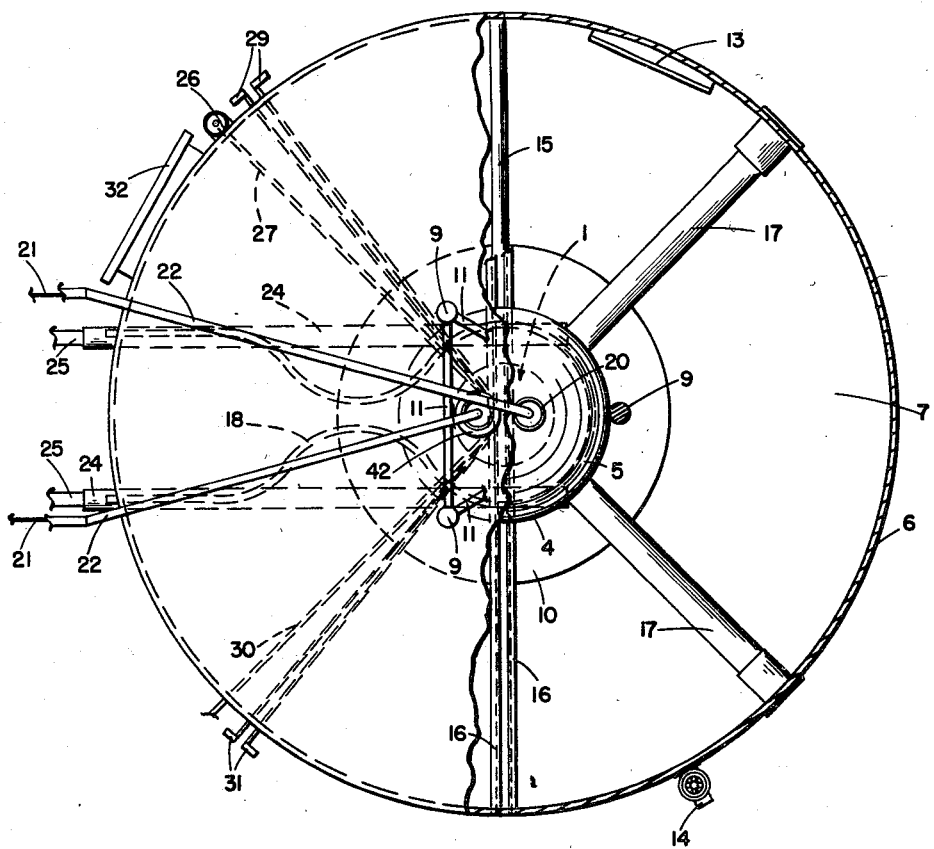
Figure 3:
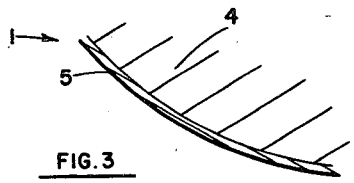
Figure 4:
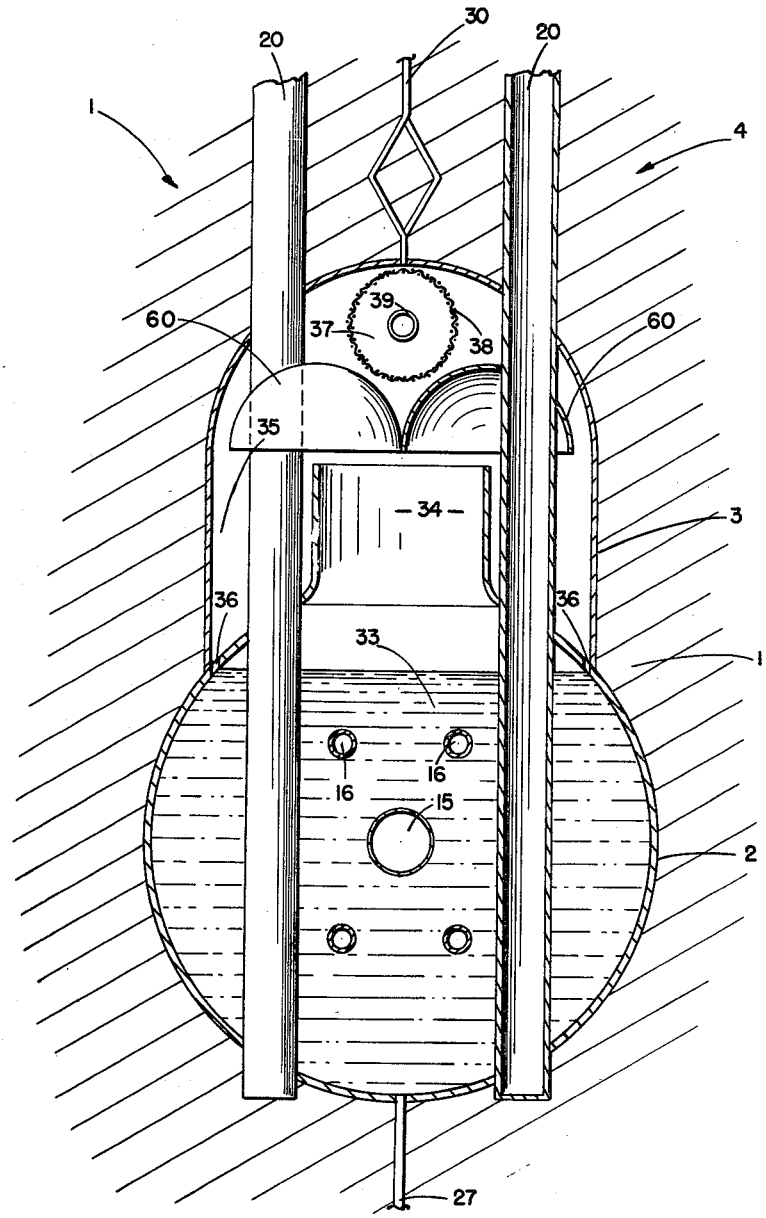
Figure 8:
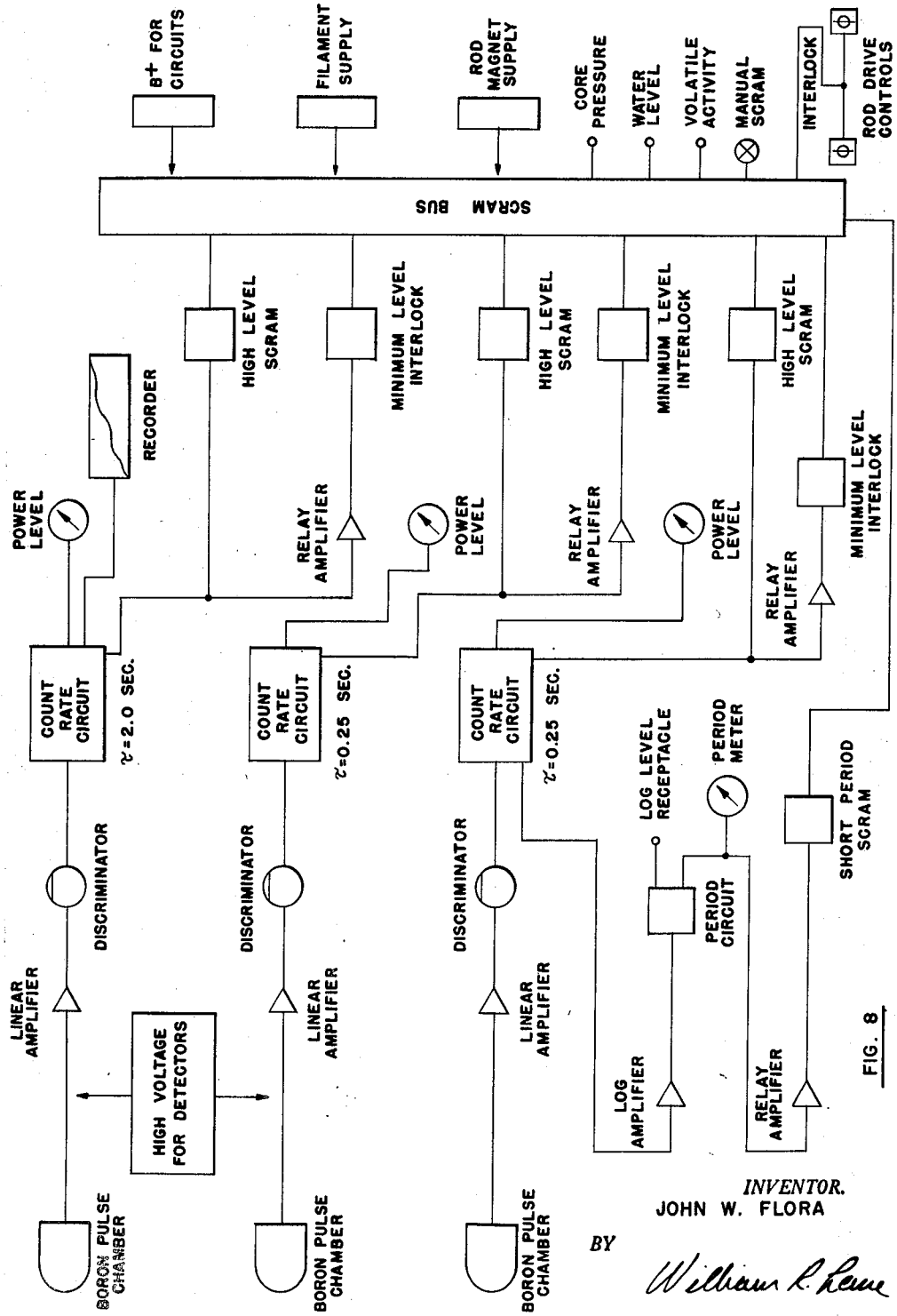

Further objects and advantages of my invention will become apparent from the following detailed description, taken together with the appended claims and the accompanying drawings. In the drawings, Figure 1 is a section view, partly in elevation, of my overall reactor system; Figure 2 is a plan view, partly in section, Figure 3 is an enlargement of a section of Figure 1, Figure 4 is a cross-section of the core, Figure 5 is a section of the control and safety rod system, Figures 6-7 are enlargements of sections of Figure 5, and Figure 8 is a block diagram of the instrumentation.

Referring now to Figures 1 and 2, the reactor core 1 consists of a spherical solution vessel 2 containing an aqueous uranium solution such as uranyl nitrate or uranyl sulphate, uranyl sulphate being preferred. Above the solution vessel is an overflow canopy 3 for holding and slowly returning core solution expelled during a nuclear excursion. A catalytic gas recombiner is positioned in the overflow chamber for recombining hydrogen and oxygen released by nuclear irradiation of water in the core; the resulting recombined water is returned to the core.

The core is positioned in a lead case 4; the lead acts both as a gamma shield and also as an efficient neutron reflector. Previously, only the light elements, such as graphite, have been found suitable as reflectors. A number of benefits flow from this configuration. Only a minimum weight of lead is required for gamma shielding due to proximity to the core. There is no need for expensive, solid reflector such as pure graphite. The lead is much cheaper and weighs only one-quarter as much and occupies one-fifteenth the usual volume of graphite. Maintenance in the proximity of the radioactive core 1 immediately after reactor shut-down is permitted by the shielding against residual gamma ray activity. Exceptional core strength against internal pressures is achieved by this reinforcing structure. Finally, disposal and transportation of the unit after shut-down is greatly facilitated by this shielding arrangement. The lead case 4 is fabricated by pouring molten lead in a thin aluminum mold 5 surrounding the finished core as shown in Figure 3. A plurality of holes is provided in mold 5 for tubes which exit the core and pass through lead case 4. The aluminum mold 5 is retained as a permanent component of the assembly to provide means of attaching accessories such as valve brackets to the core without compromising the quality of lead shield 4 with bolt inserts, etc.

The reactor assembly is suspended in a tank 6 of ordinary light water 7; demineralization and purification of the water is not necessary as with other reactors. The core 1 and shield unit 4 is supported in the tank by a steel cradle 8 suspended from three vertical steel tubes 9. The tubes are welded at the top and to a base plate 10 at the bottom of tank 6. Struts 11 connect the tubes on top of the tank. Tipping is prevented by a horizontal ring brace 12 joining the vertical members at an elevation such that it is in contact with the upper part of the mold. Rotation is prevented by two straps welded to the mold and passing over the ring. Viewing windows 13 are provided in tank 6 for visual observation of the reactor. A water drain line 14 is supplied for emptying the tank and a hatch 32 for personnel entry into the empty tank.

The water tank 6 has a number of notable advantages. It is the principal neutron shield and eliminates the fixed concrete aggregate usually employed for the purpose. It allows the reactor to be completely portable between factory and installation and permits the use of the neutron shield material as a heat transfer medium for core cooling in higher power models. The introduction of new experimental facilities which pass through shield 4 with a minimum of alteration is permitted, and, of course, the shield material may be readily disposed of when transporting the reactor is required. The tank 6 further serves as a secondary enclosure for core fluid in the unlikely event of a nuclear incident. The only building modifications which might be necessary to accommodate the tank and reactor are floor bracing and temporary removal of doors or windows to permit entry of the tank, which is typically an 8 ft. equilateral cylinder.

Passing through core 1 is a central, relatively large exposure tube 15 surrounded by four smaller exposure tubes 16. This permits considerable versatility for conducting experiments. Two beam tubes 17 (tubes which run to the vicinity of core 1 but not through) are included, one for gamma ray exposure and the other for neutron production. A neutron source conduit 18 also reaches to the immediate vicinity of the core. The source conduit 18 is simply a tube which directs a neutron background capsule to the immediate vicinity of the neutron detectors and core vessel. It exits water tank 6 at each side of a control console 19, thus allowing the operator to manipulate the position of the source by moving an endless line to which the source is attached. The conduit 18 is distorted from a straight path in the horizontal plane between core 1 and the tank wall to prevent neutron and gamma ray streaming. Two vertical control-safety rod thimbles 20 pass through the core and are part of the primary enclosure. Cables 21 run from control rods in the thimbles through a conduit 22 to a control rod drive mechanism 23 mounted on the control console. Detector tube 24, containing neutron counters, passes from the control console to lead shield 4.

Shielding of the tubes which traverse the water medium is accomplished with inserts of a neutron and gamma ray absorbing material, such as paraffin with lead tips. The detector tubes are filled with wooden rods 25 drilled to accommodate a neutron counter.

A fuel loading vessel 26, for charging, sampling and distilling fuel solution, is provided on the outside of tank 6; it is sealed vacuum-tight to provide continuity in the secondary enclosure during operation. A line 27 runs from the mixing vessel to the bottom of sphere 2 to permit fuel solution transfer. A valve 28 is located in line directly below lead case 4 to prohibit migration of radioactive solution through line 27 to mixing bowl 26. Another valved line (not shown) allows direct gravity drain of the system to the outside of the water tank. Both lines are provided with valve extension rods 29 which extend outside the tank and permit manual operation of the few valves in the system. This achieves a cost saving over electronically controlled valves. The fill and drain line arrangement permits core 1 to be drained while tank 6 remains full of water 7. The lines and valves are stainless steel, while the bowl for fuel loading vessel 26 is of glass. The valves in the primary system are commercial rotating-ball, quarter-turn type valves.

Two gas lines 30 enter the core at the recombination chamber. These lines are provided for making experimental studies and utilizing the active volatile fission products from the core. Both lines 30 extend to the outside of the pool tank and are valved off on aluminum mold 5 at the lead surface with valves. The lines are routed to the bottom of the tank near its center and are laid along the bottom of the tank to their exit location at the wall; this allows for full water shielding. Both lines 30 are valved and are provided with extension rods 31 for manual valve operation. A manometer (not shown) is connected to one of the gas lines and is located entirely within the water tank. If the pressure within core vessel 1 exceeds a low grade vacuum, say if the pressure is greater than approximately minus 23 inches Hg, the mercury breaks contact with a probe (MgO insulated thermocouple wire swaged in a stainless steel sheath) which results in opening of an interlock which scrams the reactor. The manometer is of the closed type, thus preserving the primary enclosure.

Referring now to Figure 4, the core vessel 1 consists of three spinnings of a corrosion-resistant metal such as zirconium, nickel-chrome alloys or preferably stainless steel, and one connecting sleeve. Two hemispherical spinnings are welded to form spherical solution vessel 2, which contains the fuel solution 33, and the third rolled to form canopy 3. The solution vessel 2 is provided with a large throat 34 which conducts fuel solution 33 expelled during a nuclear excursion to deflector plates 60, which, in turn, direct the fuel solution into an annulus 35 formed by canopy 3 and throat 34. The large diameter throat 34 is provided to reduce resistance to expulsion, and consequently, the orifice pressures which will attend a severe excursion. Drain holes 36 are located at the bottom of annulus 35 to allow the slow return of core solution to the core. The annulus volume relative to the core solution volume may satisfactorily vary; a relative volume of at least approximately 25% is quite satisfactory to damp even a serious nuclear excursion.

Control and safety rod thimbles 20 pass vertically through the core, are capped at their lower ends, and emerge above canopy 3 only a short distance before terminating as open tubes. These thimbles, being part of a primary enclosure, are stainless steel. Also shown in this figure are main exposure facility 15 and four auxiliary exposure facilities 16, solution fill line 27 and gas withdrawal lines 30.

Water is radiolytically decomposed into hydrogen and oxygen. If the gases are not recombined, dangerous hydrogen inflammations or even detonations might occur. Also, the loss of core solution will affect the molarity of the uranyl sulphate solution and, hence, have nuclear consequences. For these reasons it is necessary that the hydrogen and oxygen be recombined into water and returned to the core; preferably this is internally accomplished so that fission gases are not released to the atmosphere. The radiolytic hydrogen and oxygen are here catalytically recombined over pellets of platinized alumina, $\frac{1}{8}''$ equilateral cylinders, 0.3% by weight platinum. The pellets are contained in an annulus 37 formed by a cylindrical screen 38 and a sleeve 39. The sleeve 39 is welded to canopy 3 and end plates for the annulus are tack welded to sleeve 39 to facilitate heat transfer. The catalyst bed will normally remain dry but since the pellets should be dry to be efficient, a resistance heater is passed through the sleeve to heat the pellets as necessary. The continuity of lead shield 4 is not disrupted by sleeve 39 for a lead plug fills the access hole to sleeve 39 after the heater has been positioned. While the gas recombiner can effectively recombine over a wide range of temperatures and pressures, and is designed to handle the gas output at reactor powers at least as high as 400 watts (the reactor, as shown below, is designed for operation at 5 watts continuous), it is found that the pellets will quietly recombine radiolytically-produced hydrogen and oxygen with only natural convection circulating the gases in the reactor vessel at low grade vacuum (e.g., $-25''$ Hg). In any event, the strength of the system with the lead shield is such as to sustain strong hydrogen inflammations or detonations without danger to the integrity of the system. For further details concerning the present type of gas recombiner, reference is made to the co-pending application of the common assignee, S.N. 605,081, filed August 20, 1956, in the names of William N. McElroy and Grant O. Haroldsen for "Vapor Pressure Water Boiler Reactor."

The control and safety rod system is shown in Figures 5–7. Two rods 40 are provided which serve as both safety and control rods; they travel in steel thimbles 20. The thimbles 20 are lined with aluminum liner 41. The control and safety rod thimbles 20 are each equipped with flanges 42, which after gasketing, bolt to the tank top. The lower ends of rods 40 are composed of a sheet of a material with a high thermal neutron absorption cross-section 43 wrapped around an aluminum rod 45. Suitable materials are boron, cadmium and hafnium or compounds thereof such as Boral (boron carbide-aluminum), cadmium being preferred. In a fully raised position, rods 40 are located in overflow reservoir 3, which serves to reduce the reactivity offered by any fuel solution retained in that volume. Their tips are at the fuel solution level to insure prompt decrease in reactivity when they are released. The lower ends of rods 40 are fabricated by reducing the diameter of solid aluminum rod 45 slightly more than the amount required to provide running clearance in the steel sleeve. The upper ends of the rod are drilled and tapped to provide attachment of lead end pieces 44 which are cast to the rod. A temporary mold is used for the pouring of lead pieces 44. The end pieces 44 are required in order to maintain the continuity of the lead reflector-shield when the rods are raised during reactor operation. Cable clamps 46, cast directly into lead plugs 44, provide means of attachment for braided steel cable 21 used to raise the rods. The cables pass through Lucite plugs 47 provided in steel thimbles 20 to maintain shielding effectiveness, and then through conduits 22 mounted on top of the water tank and passed directly to the control console.

The control-safety rods are actuated by control rod drive mechanism 23. Electric motors 48 are manually controlled by the operator. These motors have a small spur gear 49 mounted on the output shaft 50 which turns at a very low r.p.m. This gear engages a similar spur gear 51 which has a threaded shaft on its axis. As the gear is rotated the screw is forced up or down. This screw runs vertically upward inside and on the centerline of a Plexiglas tube 52 and is attached to a D.C. holding magnet 53, the contact base of which is oriented upward. The magnet 53, when energized, attachs itself to an iron disc 54, to which control-safety rod cables 21 are attached. When the magnets are deenergized, lead plugs 44 drive rods 40 to their down position. Braking is accomplished by allowing a step 55 in the Lucite bar 47 to come in contact with a corresponding step 56 in the thimble which is reentered in the water tank (as a part of the secondary enclosure) and provides passage for the entire assembly. The system is completely fail-safe.

Rod location information is obtained by sighting across the upper surface of contact disc 54 which is attached to the rod cable and upon which the magnet acts. The outside surface of the Plexiglas tube is wrapped with a film positive presenting a horizontal line every 0.1". Parallax is eliminated by presenting the lines on both sides of the tubes. Rod position can be determined with precision of ±0.03". There is no need for costly electronic devices to determine rod position as in other systems. The motor drive switches are so interconnected that only one motor at a time may be energized for rod withdrawal. Effort to operate the motors for simultaneous withdrawal results in no rod movement whatever. However, the rods may be driven in simultaneously. This adds considerably to the safety of the reactor.

The rods are interlocked so that the safety rod must be fully withdrawn before the control rod motor can be energized. This interlock assures that when the reactor is operating, the full worth of one rod is available for emergency use. The interlock is provided with a limit switch on the safety rod magnet drive. The rods are withdrawn at a rate of 0.06" per second which corresponds to about 0.02" in reactivity per second. This represents a conservative withdrawal speed, and a motor with a greater R.P.M. could be used if operation is found to be tedious.

While the instrumentation is not critical and conventional reactor control circuits may be satisfactorily employed, the instrumentation now described with reference to Figure 5, which is essentially self-explanatory, has been tailored to provide safety, low cost and flexibility. All circuity is located in control console 23 adjacent to the water tank, where a single operator can control and watch the entire operation.

The neutron detectors for the system are three conventional boron pulse chambers, each located in detector tube 24 in the water tank. These counters are located in the detector tubes and are positioned in bored holes at the end of the wooden inserts 25 which plug the detector tubes. The rods are within reach of the control operator and may be manually adjusted. At start-up, the rods are fully inserted, which places them in their most active location. Sufficiently high pulse rates are obtainable after amplification by a linear amplifier and passage through a discriminator for conventional size detectors to drive a counting-rate meter. As power level increases, the detectors are withdrawn manually by the operator by partial removal of the wooden rod. Total movement of the rods will be small, of course, due to the rapid attenuation of neutrons in water. Position steps fall into recesses in the rods and mark the scale changes as the rods are withdrawn, providing an automatic and positive means of desensitizing the channels in fixed steps.

The rate circuits are adjusted in response time constants to provide two one-quarter second channels and one two-second channel. The output of all of the circuits are fed to minimum level interlocks through relay amplifiers. The fast circuits are intended primarily for safety and observation. The output of one is fed, through a log amplifier and differentiator, to a period circuit having a meter and a short period scram. The slower circuit output is fed to a power recorder and high level scram. Output of the latter is reported by an inexpensive linear recorder. The amplifiers for the three channels as well as the rate circuits are all built on one chassis. High voltage is supplied to each detector by a conventional voltage supply. A general purpose power supply serves all rate circuits and their amplifiers. A miniature Sola transformer is included to guarantee voltage stabilization.

The reactor is interlocked so that operation cannot be initiated or maintained if any of the following conditions are present:

A.C. power is not on.

Power level shown by any channel is low. This interlock assures against removal of a background source from its proper location for start-up, detector burn-up, loose cable connections, and electronic failures in the power supply, amplifier, and rate circuits.

Power level shown by any channel is high. This interlock employs relays which open in milli-seconds, providing added safety against power transients. The control-safety rods suspended at the solution-surface level assure cut-back in reactivity after a step increase in power within 0.30 second under the least favorable conditions (circuit far downscale at the instant of said increase).

A short period interlock provides the usual protection against rapid power increase without the delay introduced by the fixed level trip devices.

Another interlock is to provide in the event that the water level in the tank is low and is designed for the protection of personnel from radiation. A float switch is mounted inside the tank and opens when the water level drops one-quarter to one-half inch.

A final interlock limits the initial pressure, and thereby the peak pressure in case of a hydrogen-oxygen explosion, and also assures against pinpoint leakage of the core fluids into the core tank. A "go-no go" mercury manometer tube is positioned with a branch of one of the gas lines and is located entirely within the water tank, as previously described.

The following general and operating reactor specifications are offered as the design of a preferred embodiment of my invention.

TABLE I

*Reactor specifications*

Power level—5 watts
Fuel—aqueous uranyl sulphate ($UO_2SO_4$)
Core—12" diameter sphere, stainless steel, 0.085" thick
Tank—8 ft. cylindrical steel tank, 0.19" thick
Regurgitator annulus—9" O.D., 4" I.D., 3.6" high, 3.28 liters volume
Exhaust throat—4" O.D.

Critical mass—approximately 1,000 gm. (~90° $U^{235}$)
Mass coefficient of reactivity—approximately .029%/gm.
Fuel solution volume—12.9 liters
$U^{235}$ concentration—approximately 77.5 gm./liter
Average power density—approximately 0.39 mw./cm.$^3$.
Maximum thermal neutron flux—$1.7 \times 10^8$ n/cm.$^2$-sec.
Gamma ray beam intensity—approximately $10^6$ photons/cm.$^2$-sec.
Thermal neutron beam intensity—approximately $5 \times 10^5$ n/cm.$^2$-sec.
Fast neutron beam intensity—approximately $5 \times 10^4$ n/cm.$^2$-sec.
Reactivity—1.25% or less.
Temperature coefficient of reactivity—minus approx. 0.025%/°C.
Control-safety method—cadmium cylinders (2) internal to core.
Control safety margin—approximately 3.6% Δk./k.
Reflector—lead (6").
Shield—lead (6") and water (36").
Shield Liner—aluminum, ⅛" thick.
Recombiner—catalytic, ⅛" equilateral cylinders of platinized alumina; natural convection.
Moderator—light water.
Cooling—natural conduction and convection.
Core yield pressure—1475 p.s.i.
Typical induced activity level of shield water—$5 \times 10^{-5}$ μc./ml. or 0.006 m.p.c.
Maximum core operating pressure—minus 22" Hg. Pressure obtained by attaching pump to gas lines after fuel solution added.

The above is merely illustrative and should not be construed as restrictive of my invention which is inherently very broad. It is expected that design modifications may be made by those skilled in the art that are still within the spirit of my invention. My invention, therefore, should be limited only as is indicated by the appended claims.

Having thus described my invention, I claim:

1. A nuclear reactor comprising a reactor core, an aqueous uranyl solution disposed in said core as the active fuel solution, an internal catalytic hydrogen-oxygen recombiner positioned in said core, a contiguous lead reflector-shield enclosing said core, and a tank containing water as a neutron shield, said core-shield assembly being positioned in said tank.

2. The reactor of claim 1, wherein said reactor core comprises a solution vessel, a canopy positioned above said core for containment of overflow solution and a catalytic hydrogen-oxygen recombiner position in said canopy.

3. A nuclear reactor comprising a closed reactor core, said core comprising a fuel solution vessel, experimental tubes passing through said vessel, aqueous uranyl sulfate being provided in said vessel as the fuel solution, a canopy positioned above said vessel, a throat passing into said canopy from said vessel, baffle means at the exit of said throat, said throat and said canopy forming an annular overflow container, drain means in said container connecting to said throat for the slow return of core solution overflow to said solution vessel, and a catalytic hydrogen-oxygen recombiner positioned in said canopy above said baffle means; a contiguous lead reflector-shield encasing said core assembly; a plurality of control rod thimbles passing into said core, control rods positioned in said thimbles inside said core, said control rods comprising at their ends within said core a material having a high thermal neutron absorption cross-section and lead reflector plugs positioned immediately behind said high cross-section material, said lead plugs operating in said lead shield to preserve the structural integrity of said shield; and a tank containing water as a neutron shield, said core-reflector assembly being positioned in said tank.

4. A portable nuclear research reactor comprising a reactor core, said core comprising a fuel vessel containing an aqueous uranium fuel solution, an integral canopy communicating with said vessel, overflow container means in said canopy for temporary retention of fuel solution overflow and for return thereof to said vessel, baffle means in said canopy for directing said overflow into said overflow container, a catalytic hydrogen-oxygen recombiner in said canopy protected from contact with said solution by said baffle; a contiguous lead reflector-shield enclosing said core; and a tank containing water as a neutron shield, said core-lead assembly being positioned in said tank.

5. A portable nuclear reactor comprising a reactor core, said core comprising a fuel vessel containing an aqueous uranyl fuel solution, an integral canopy positioned above said solution vessel for containment of fuel solution overflow, and a catalytic hydrogen recombiner in said canopy; an integral lead reflector-shield enclosing said core; a plurality of thimbles passing through said core, control-safety rods positioned in said thimbles, said rods comprising at their ends within said core a section of a material having a high thermal neutron absorption cross section and a section of lead immediately behind said absorber section, said lead section being adapted to travel within said lead reflector-shield, thereby maintaining the integrity of said reflector-shield; and a tank containing water as a neutron shield, said core-lead assembly being positioned in said tank.

6. The reactor of claim 5, wherein said control-safety rods are interlocked for simultaneous insertion into said core and for individual withdrawal from said core.

7. A portable nuclear reactor comprising a reactor core, said core comprising a fuel vessel containing an aqueous uranyl fuel solution, an integral canopy communicating with said vessel, a duct portion of said vessel passing into said canopy, said duct and said canopy defining an annular overflow container, baffle means positioned at the mouth of said duct in said canopy, said baffle means directing core solution overflow into said annulus, drain holes connecting said annulus with said solution vessel for the slow return of overflow solution to said solution vessel, an internal catalytic hydrogen-oxygen recombiner positioned in said canopy, said baffle means protecting said recombiner from contact with said solution and directing recombined water into said annulus; a contiguous lead reflector-shield enclosing said core; and a tank containing water as a shield, said core-lead assembly being positioned in said tank.

8. A portable nuclear research reactor comprising a reactor core, said core comprising a solution vessel containing an aqueous uranium fuel solution, a canopy portion integral with said solution vessel and communicating therewith, means in said canopy for retention of fuel solution expelled during a nuclear transient, an internal catalytic recombiner in said canopy, said recombiner comprising a sleeve portion adapted to contain a heater, a screen around said sleeve, and platinized aluminum pellets disposed in the annulus defined by said screen and said sleeve; a contiguous lead reflector-shield enclosing said core; thimble means penetrating said reflector-core assembly, control-safety rods positioned in said thimbles; and a tank containing water as a neutron shield, said core-reflector assembly being positioned in said tank.

9. The reactor of claim 8 wherein said safety and control rods comprise at the ends thereof within said core a first section of a material having a high thermal neutron absorption cross section, and a second section of lead immediately behind said absorber section, said lead section being adapted to travel within said lead reflector-shield during operation of said control rods, thereby maintaining the integrity of said lead reflector-shield.

10. The reactor of claim 4 wherein a plurality of tubes for experimental purposes pass through said solution vessel.

11. A nuclear research reactor comprising a reactor core containing an aqueous uranium fuel solution, an internal catalytic hydrogen-oxygen recombiner positioned in said core above the level of said fuel solution, means for protecting said recombiner from contact with particulate fuel solution, and overflow means for temporarily retaining expelled fuel solution during a nuclear excursion; a contiguous lead reflector-shield enclosing said core; at least one thimble passing through said core, a control-safety rod operating in each said thimble, said control-safety rod having a lead section adapted to operate in the portions said thimble opposite said lead reflector-shield, thereby maintaining the integrity of said lead reflector-shield; and a tank containing water as a shield, said core-reflector-shield assembly being positioned in said tank.

12. A portable nuclear research reactor comprising a reactor core, said core comprising a vessel containing an aqueous uranyl sulfate fuel solution, an integral canopy positioned above said solution vessel, a duct member connecting said solution vessel with said canopy, said canopy and said duct defining an annular overflow container, drain holes connecting said overflow container with said solution vessel, baffle means at the mouth of said duct in said canopy for directing expelled fuel solution into said overflow container, and a catalytic hydrogen-oxygen recombiner positioned in said canopy above said baffle, said baffle protecting said recombiner from contact with particulate fuel solution and directing water reconstituted by said recombiner into said annular overflow container for return to said solution vessel; a contiguous lead reflector-shield enclosing said core assembly; a plurality of control rod thimbles passing through said lead reflector-shield and said core assembly, control-safety rods positioned in said thimbles, said rods having a lead portion opposite said rod reflector-shield, thereby maintaining the integrity of said reflector-shield during operation of said rods; and a tank containing water as the primary neutron shield, said core-reflector assembly being positioned in said tank.

References Cited in the file of this patent

Beck et al.: ORO-33, pages 16, 17, 22, 23, 28, 29, 30, 31, 32, 33, 34, 44, 45, July 5, 1940, Technical Information Service, Oak Ridge, Tenn.

Baker et al.: AECD-3063, pages 1-14, Sept. 4, 1944, Technical Information Service, Oak Ridge, Tenn.

Bunker et al.: LA-1337, U.S. Atomic Energy Commission Document, page 7, Mar. 6, 1952.

Busey et al.: Nucleonics, vol. 13, pages 72-73, November 1955.

TID-5275, "Research Reactors," pages 170-171, Aug. 18, 1955.